(12) United States Patent
Miyake

(10) Patent No.: US 12,204,041 B2
(45) Date of Patent: Jan. 21, 2025

(54) LOCATION ESTIMATION APPARATUS, LOCATION ESTIMATION METHOD, AND PROGRAM FOR LOCATION ESTIMATION

(71) Applicant: JVCKENWOOD Corporation, Yokohama (JP)

(72) Inventor: Fumiaki Miyake, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 358 days.

(21) Appl. No.: 17/898,426

(22) Filed: Aug. 29, 2022

(65) Prior Publication Data

US 2023/0003828 A1   Jan. 5, 2023

Related U.S. Application Data

(63) Continuation of application No. PCT/JP2021/004521, filed on Feb. 8, 2021.

(30) Foreign Application Priority Data

Mar. 18, 2020   (JP) .................................. 2020-047671

(51) Int. Cl.
 *G01S 5/02*   (2010.01)
 *G01S 5/00*   (2006.01)
 *H04W 64/00*   (2009.01)

(52) U.S. Cl.
 CPC .......... *G01S 5/0268* (2013.01); *G01S 5/0036* (2013.01); *H04W 64/00* (2013.01)

(58) Field of Classification Search
 CPC ........ G01S 5/0268; G01S 5/0036; G01S 5/14; G01S 5/0205; G01S 5/021; G01S 1/042; H04W 64/00
 See application file for complete search history.

(56) References Cited

U.S. PATENT DOCUMENTS

| | | | |
|---|---|---|---|
| 2010/0216488 A1 | 8/2010 | Markoulidakis | |
| 2011/0141909 A1* | 6/2011 | Hibara | G01S 5/0036 370/241 |
| 2014/0087763 A1* | 3/2014 | Gao | G01S 5/0289 455/456.3 |
| 2021/0185507 A1* | 6/2021 | Cholas | H04L 61/5007 |

FOREIGN PATENT DOCUMENTS

| | | |
|---|---|---|
| JP | 2014052208 A | 3/2014 |
| JP | 2015152565 A | 8/2015 |
| JP | 2016048205 A | 4/2016 |
| WO | 2010021170 A | 2/2010 |

* cited by examiner

*Primary Examiner* — Farid Seyedvosoghi
(74) *Attorney, Agent, or Firm* — Procopio, Cory, Hargreaves & Savitch LLP

(57) ABSTRACT

A location information server includes: an acquisition unit configured to acquire received signal strengths of radio signals transmitted from a transmitter and received at a receiver; an estimation unit configured to estimate a location of the transmitter or receiver, using at least the top three received signal strengths among the acquired received signal strengths; and a reliability calculation unit configured to calculate a reliability of the location estimation based on the received signal strengths that have been used.

7 Claims, 10 Drawing Sheets

LOCATION ESTIMATION APPARATUS, LOCATION ESTIMATION METHOD, AND PROGRAM FOR LOCATION ESTIMATION

CROSS REFERENCE TO RELATED APPLICATION

This application is based upon and claims the benefit of priority from Japanese patent application No. 2020-047671, filed on Mar. 18, 2020, the disclosure of which is incorporated herein in its entirety by reference.

BACKGROUND

The present invention relates to a location estimation apparatus, a location estimation method, and a program for location estimation.

In recent years, the range of utilization of location estimation systems for estimating locations of electronic devices has been widening. As location estimation systems, in addition to systems for calculating outdoor location information using the global positioning system (GPS) satellite, systems have been implemented in which Bluetooth (registered trademark) and wireless Local Area Network (LAN) signals are used to obtain the indoor location information that radio wave from GPS satellite cannot be received.

In these systems, a three-point positioning method of estimating a location based on the received signal strength indicator (RSSI) is used. As related techniques, for instance, Japanese Unexamined Patent Application Publication No. 2016-48205 and Japanese Unexamined Patent Application Publication No. 2014-52208 are known. In the technique disclosed in Japanese Unexamined Patent Application Publication No. 2016-48205, under an environment in which a plurality of receivers are installed, transmission signals transmitted from a transmitter are received, and the location of the transmitter is estimated from the signal strengths of the reception signals received by the plurality of receivers. In the technique disclosed in Japanese Unexamined Patent Application Publication No. 2014-52208, under an environment in which a plurality of transmitters are installed, the location of the receiver is estimated from the signal strengths of the reception signals received by the receiver.

SUMMARY

In the techniques disclosed in Japanese Unexamined Patent Application Publication No. 2016-48205 and Japanese Unexamined Patent Application Publication No. 2014-52208, the location of the transmitter is estimated by the three-point positioning method from the signal strengths of the signals from the transmitter received by the receivers located at three points. Alternatively, the location of the receiver is estimated from the signal strengths of the signals from the transmitters located at three points, received by the receiver. However, in the techniques disclosed in Japanese Unexamined Patent Application Publication No. 2016-48205 and Japanese Unexamined Patent Application Publication No. 2014-52208, since an error occurs in the calculation of the location due to the environment and the like between the transmitters and the receivers, there is a problem that it is difficult to accurately estimate the location.

This embodiment provides a location estimation apparatus including: an acquisition unit configured to acquire received signal strengths of radio signals transmitted from a transmitter and received at a receiver; an estimation unit configured to estimate a location of the transmitter or receiver, using at least the top three received signal strengths among the acquired received signal strengths; and a reliability calculation unit configured to calculate a reliability of the location estimation based on the received signal strengths that have been used, in which the estimation unit re-estimates, based on the reliability of the location estimation for a first location estimation subject and a second location estimation subject, the location of the first location estimation subject, using the location estimation result for the second location estimation subject and the received signal strengths of the radio signals transmitted and received between the first location estimation subject and the second location estimation subject.

This embodiment provides a location estimation method including: acquiring received signal strengths of radio signals transmitted from a transmitter and received at a receiver; estimating a location of the transmitter or receiver, using at least the top three received signal strengths among the acquired received signal strengths; and calculating a reliability of the location estimation based on the received signal strengths that have been used, in which based on the reliability of the location estimation for a first location estimation subject and a second location estimation subject, the location of the first location estimation subject is re-estimated, using the location estimation result for the second location estimation subject and the received signal strengths of the radio signals transmitted and received between the first location estimation subject and the second location estimation subject.

This embodiment provides a program for location estimation for causing a computer to perform processing including: acquiring received signal strengths of radio signals transmitted from a transmitter and received at a receiver; estimating a location of the transmitter or receiver, using at least the top three received signal strengths among the acquired received signal strengths; and calculating a reliability of the location estimation based on the received signal strengths that have been used, in which based on the reliability of the location estimation for a first location estimation subject and a second location estimation subject, the location of the first location estimation subject is re-estimated, using the location estimation result for the second location estimation subject and the received signal strengths of the radio signals transmitted and received between the first location estimation subject and the second location estimation subject.

DETAILED DESCRIPTION

Figure 1:
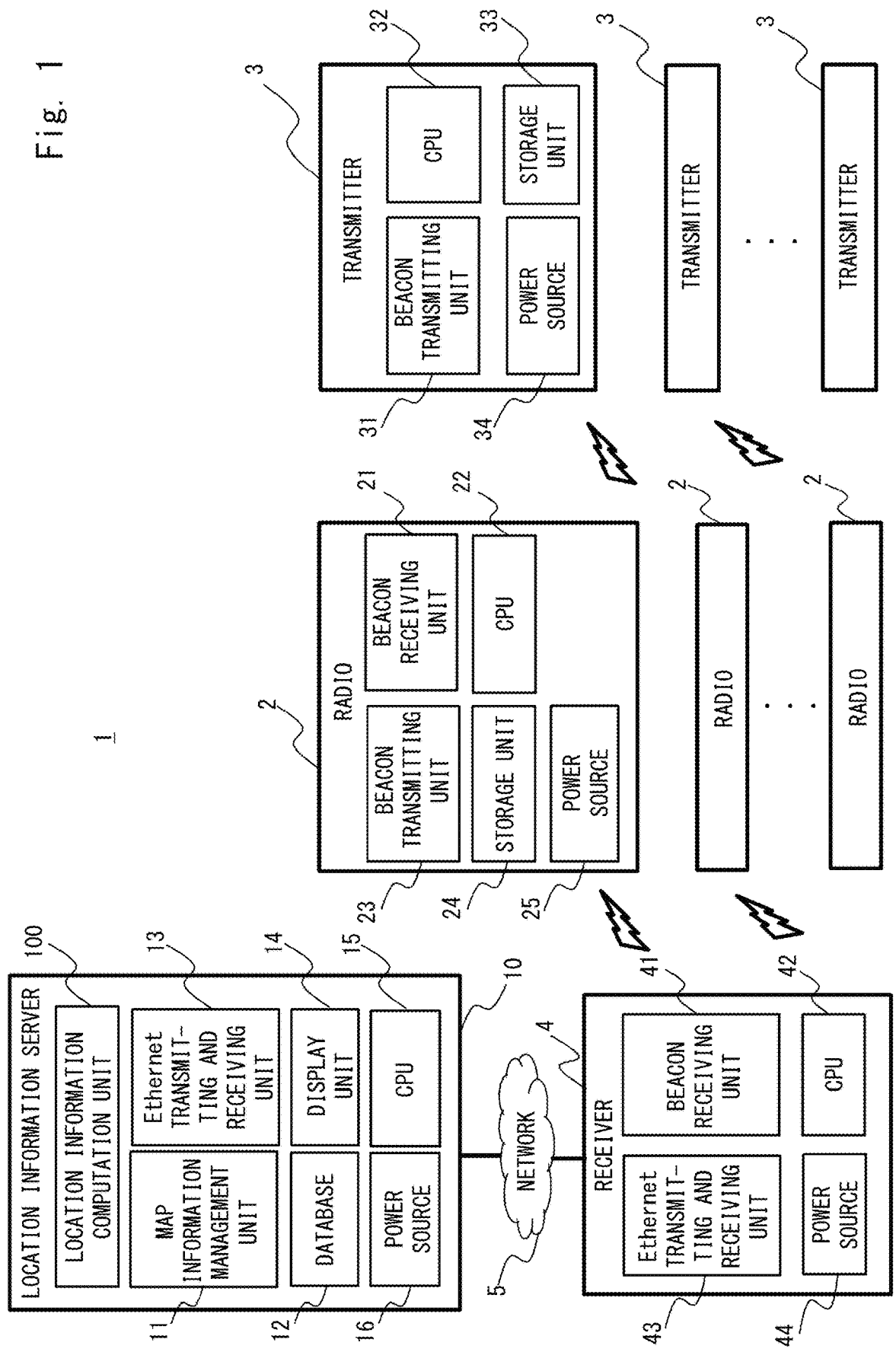
FIG. 1 is a configuration diagram showing a configuration example of a location estimation system according to Embodiment 1.

The following will describe the embodiments with reference to the drawings. In each drawing, identical elements are denoted by the same reference numerals, and redundant explanations will be omitted as necessary.

Embodiment 1

Figure 2:
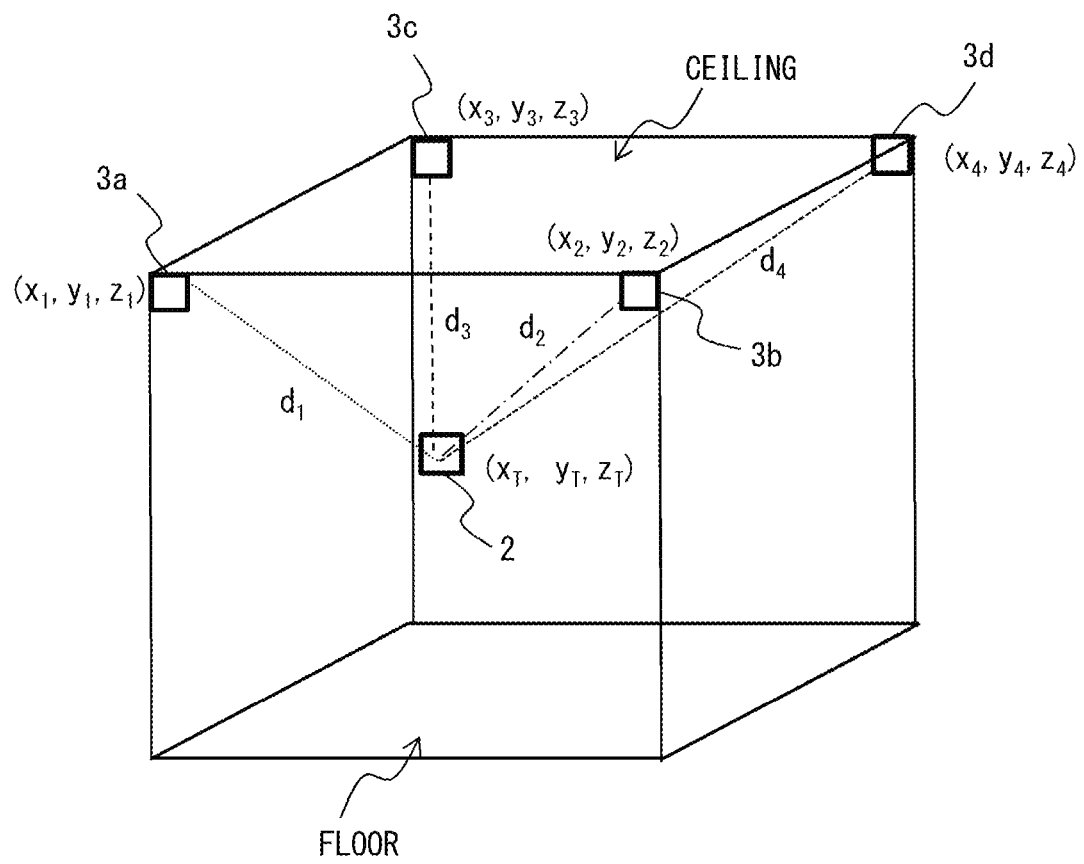
FIG. 2 is a perspective view of a room illustrating an installation example of transmitters according to Embodiment 1.
Figure 3:
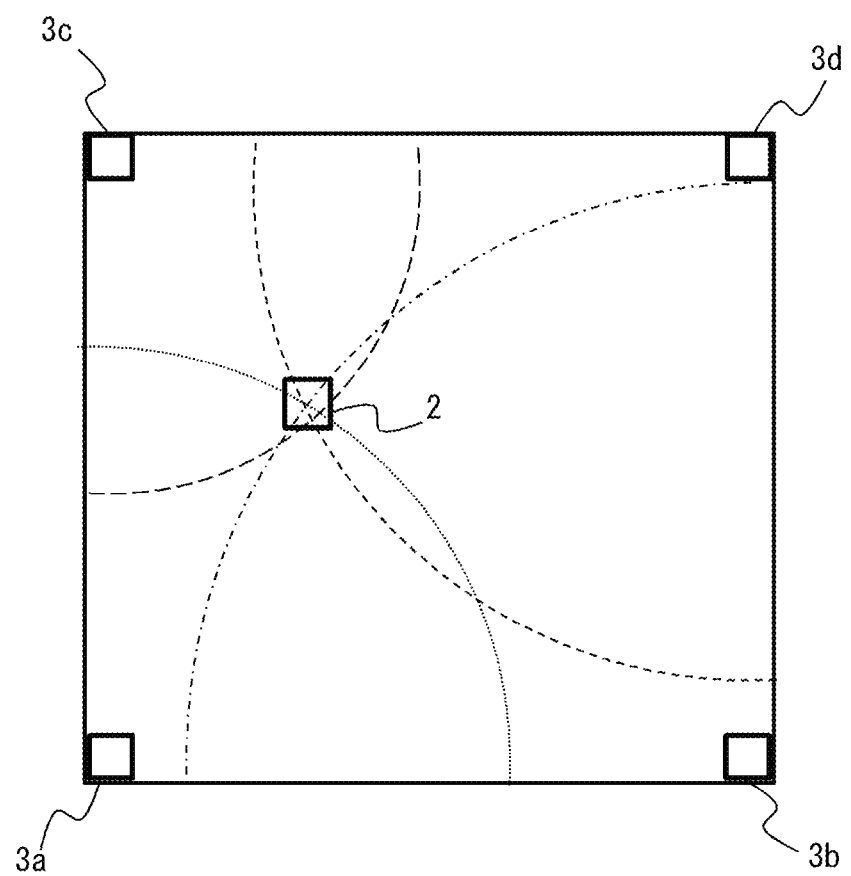
FIG. 3 is a plane view of the room illustrating the installation example of the transmitters according to Embodiment 1.

Embodiment 1 will now be described. FIG. 1 is a configuration diagram showing a configuration example of a location estimation system according to this embodiment. FIG. 2 is a perspective view of a room illustrating an installation example of transmitters. FIG. 3 is a plane view of the installation example shown in FIG. 2 viewed from the ceiling side of the room.

As shown in FIG. 1, a location estimation system 1 according to this embodiment includes a plurality of radios 2, a plurality of transmitters 3, a receiver 4, and a location information server 10. The location estimation system 1 is a system for measuring the locations of the radios 2, using beacon signals transmitted from the plurality of transmitters 3. The beacon signals are, for example, iBeacon (registered trademark) of Bluetooth Low Energy (BLE). Note that the beacon signals are not limited to Bluetooth, and may be other radio signals such as wireless LAN.

In the examples shown in FIGS. 2 and 3, the four transmitters 3a to 3d are installed near the corners of the ceiling of a room 6. It can be said that the transmitters 3a to 3d are installed at vertices of a quadrangle in a plane view. The quadrangle composed of the transmitters 3a to 3d may be a rectangle including a square or may be any other quadrangles. The three-dimensional space in a room 6 surrounded by the transmitters 3a to 3d is a location measurement region. Upon reception of beacon signals from the transmitters 3a to 3d, the radios 2 measure the signal strengths of the beacon signals and send them to the receiver 4. The receiver 4 sends the measurement results received from the radios 2 to the location information server 10 through a network 5.

Based on the signal strengths received from the receiver 4, the location information server 10 estimates the locations of the radios 2 in the location measurement region of the room 6 by the three-point positioning method. Although the four transmitters 3a to 3d are shown in this example, five or more transmitters 3 may be disposed so as to surround the location measurement region.

Note that the plurality of transmitters 3 may be disposed at any locations such as on the floor or on the wall of a room, but in order to prevent beacon signals from being blocked by any obstacles, are preferably located at high places, for example, on a ceiling. Further, the transmitters 3 are installed indoors in this example, but are not necessarily installed indoors: the transmitters 3 may be installed outdoors and the locations of the radios 2 may be estimated outdoors.

The transmitters 3 are transmitters that transmit beacon signals to be used for location measurement. Each transmitter 3 includes a beacon transmitting unit 31, a central processing unit (CPU) 32, a storage unit 33, and a power source 34. The beacon transmitting unit 31 transmits beacon signals wirelessly in accordance with a communication standard such as the BLE. The beacon transmitting unit 31 periodically broadcasts beacon signals including ID information for identifying the transmitters 3 to the surrounding area.

The CPU 32 is a control unit configured to control each unit of the transmitters 3. The CPU 32 controls the transmission timing, the transmission power, and the like for beacon signals. The storage unit 33 is a storage unit configured to store information necessary for the operation of each transmitter 3. The storage unit 33 stores ID information and the like on the transmitters 3 included in beacon signals. The power source 34 is a battery power source or the like for the transmitters 3 to operate. The power source may be built in the transmitters 3 or may be supplied externally.

Each transmitter 3 may further include, as needed, a geomagnetic sensor for detecting the orientation of the transmitter 3, a GPS receiving unit configured to receive GPS signals, a display unit configured to show users information, a key processing unit for encryption/decryption, and the like.

The radios 2 are receivers that receive beacon signals from the transmitters 3 and are devices to be a subject of location measurement. Each radio 2 is a device configured to measure and output the received signal strengths of the beacon signals it has received. Each radio 2 also serves as a transmitter that transmits beacon signals to the receiver 4 and other radios 2. In other words, each radio 2 is a transmitter/receiver for transmitting and receiving beacon signals. Each radio 2 includes a beacon receiving unit 21, a CPU 22, a beacon transmitting unit 23, a storage unit 24, and a power source 25. The beacon receiving unit 21 receives beacon signals transmitted wirelessly from the transmitters 3 and other radios 2 in accordance with the communication standard such as the BLE and also measures the signal strengths of the beacon signals it has received.

The CPU 22 is a control unit configured to control each unit of the radios 2. The CPU 22 generates signal strength measurement information based on the ID information contained in the beacon signals received from the transmitters 3 and other radios 2 and the received signal strengths of the beacon signals. The signal strength measurement information includes the ID information (ID information on the transmitters 3 or other radios 2) contained in the beacon signals received by the radio 2 and the received signal strengths of the beacon signals. The beacon transmitting unit 23 transmits beacon signals wirelessly in accordance with a communication standard such as the BLE. Each beacon signal transmitted from the beacon transmitting unit 23 contains signal strength measurement information and ID information for identifying the radio 2. The storage unit 24 is a memory section that stores information necessary for the operation of the radio 2. The storage unit 24 stores the ID information and the like on the radio 2 contained in the beacon signal. The power source 25 is the power source for the radio 2 to operate. The power source 25 may be built in the radio 2 or may be supplied externally.

The receiver 4 is a receiver that receives beacon signals from the radios 2 and is a device that relays signal strength measurement information contained in the beacon signals it receives. The receiver 4 includes a beacon receiving unit 41, a CPU 42, an Ethernet (registered trademark) transmitting and receiving unit 43, and a power source 44. The beacon receiving unit 41 receives beacon signals containing ID information and signal strength measurement information transmitted from each radio 2. The CPU 42 is a control unit that controls each part of the receiver 4. The CPU 42 transfers the information contained in the beacon receiving unit 41 to the Ethernet transmitting and receiving unit 43. The Ethernet transmitting and receiving unit 43 communicates with the location information server 10 via the network 5 in accordance with the Ethernet standard. The Ethernet transmitting and receiving unit 43 transmits the ID information and signal strength measurement information received from each radio 2 to the location information server 10.

The location information server 10 is a location estimation apparatus that estimates the locations of the radios 2 based on the received signal strengths of a plurality of beacon signals. The location information server 10 includes a location information computation unit 100, a map information management unit 11, a database 12, an Ethernet transmitting and receiving unit 13, a display unit 14, a CPU 15, and a power source 16.

The location information computation unit 100 performs computation of the location information on the radios 2 based on the received signal strengths of the beacon signals measured by the radios 2. The location information computation unit 100 receives signal strength measurement information containing the ID information on the beacon signals received at the radios 2 and the received signal strengths from each transmitter 3 and, as shown in FIGS. 2 and 3, estimates the three-dimensional locations of the radios 2 identified from the ID information by referring to three-dimensional positional relationship between the transmitters 3 on the map and the distances (e.g., distances $d_1$, $d_2$, and $d_3$) to each radio 2 calculated from the received signal strengths. In this embodiment, the location information computation unit 100 estimates the location of each radio 2 based on the received signal strengths from, among the plurality of the transmitters 3, the first to third transmitters 3 in descending order of received signal strength. The location information computation unit 100 also calculates the reliability of calculation of location information on each radio 2. The reliability will be explained below.

The map information management unit 11 manages the map information on the database 12. The database 12 stores information necessary for the processing in the location information server 10. The database 12 stores the map information, the locations of the transmitters 3 on the map, the calculated location information on the radios 2, the reliability of calculation of location information, and the like. The Ethernet transmitting and receiving unit 13 communicates with the receiver 4 via the network 5 in accordance with the Ethernet standard. The Ethernet transmitting and receiving unit 13 receives, from the receiver 4, the ID information on the beacon signals and the signal strength measurement information that the receiver 4 has received from each radio 2.

The display unit 14 is a display unit configured to show users information. The display unit 14 displays the location information on the radios 2 superimposed on the map information. The CPU 15 is a control unit configured to control each unit of the location information server 10. For instance, the CPU 15 performs control to cause the display unit 14 to display the location information on the radios 2 computed by the location information computation unit 100. The power source 16 is a power source for the location information server 10 to operate. The location information server 10 may also include, as needed, a key processing unit for encoding/decoding, and the like.

Figure 4:
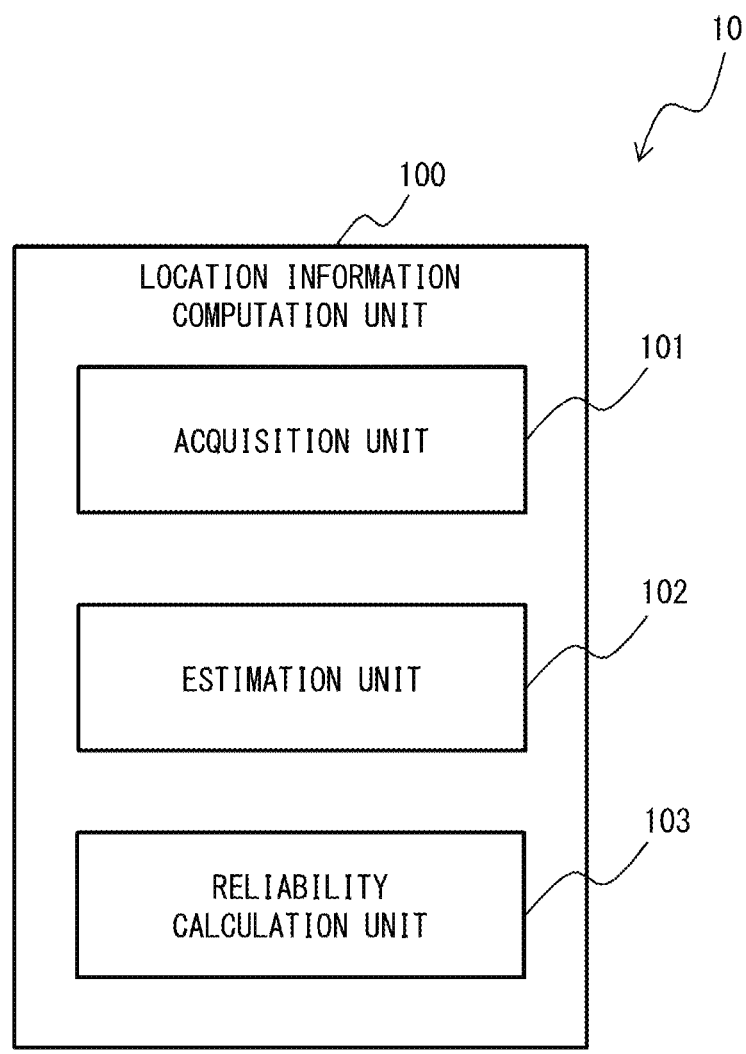
FIG. 4 is a configuration diagram showing a configuration example of a location information computation unit in a location information server according to Embodiment 1.

FIG. 4 shows a configuration example of a location information computation unit 100 in the location information server 10. As shown in FIG. 4, the location information computation unit 100 includes an acquisition unit 101, an estimation unit 102, and a reliability calculation unit 103.

The acquisition unit 101 acquires the signal strength measurement information generated in the radios 2 from the receiver 4 via the Ethernet transmitting and receiving unit 13. The estimation unit 102 estimates the locations of the radios 2 based on the signal strength measurement information acquired by the acquisition unit 101. When a plurality of radios 2 exist in the location measurement region, the location of each radio 2 is estimated. Since the locations are estimated by the three-point positioning method, the estimation unit 102 calculates the locations of the radios 2 using, of the signal strength measurement information on the beacon signals that the radios 2 receive from the plurality of transmitters 3, the signal strength measurement information on beacon signals received from three of the plurality of the transmitters 3. As higher received signal strengths may lead to more stable and accurate values, for example, the signal strength measurement information on the transmitters 3 with the highest three (top three) received signal strengths are used.

The reliability calculation unit 103 calculates the reliability of location estimation based on the received signal strengths that have been used in location estimation. To be specific, the third highest received signal strength is used as a reliability. Since the location is estimated using the top three received signal strengths, here, as an example, the third highest received signal strength among the received signal strengths used for location estimation is used as a reliability. Note that a reliability should be at least a value based on a received signal strength. Based on the reliability of the location estimation for the radio 2 and other radios 2, the estimation unit 102 re-estimates the location of the radio 2, using the location estimation results for the other radios 2 and the received signal strengths of the beacon signals that the radio 2 receives from the other radios 2.

The location estimation method of this embodiment will be explained with reference to FIGS. 5 to 7. In the case where a plurality of radios 2 exist in the location estimation region, in the location estimation method of this embodiment, the location estimation result for the radio 2 with a higher reliability of location estimation is used to estimate the locations of the other radios with lower reliabilities of location estimation. The following explains an example of location estimation for the radio 2a and the radio 2b that is located in the vicinity of the radio 2a.

Figure 5:
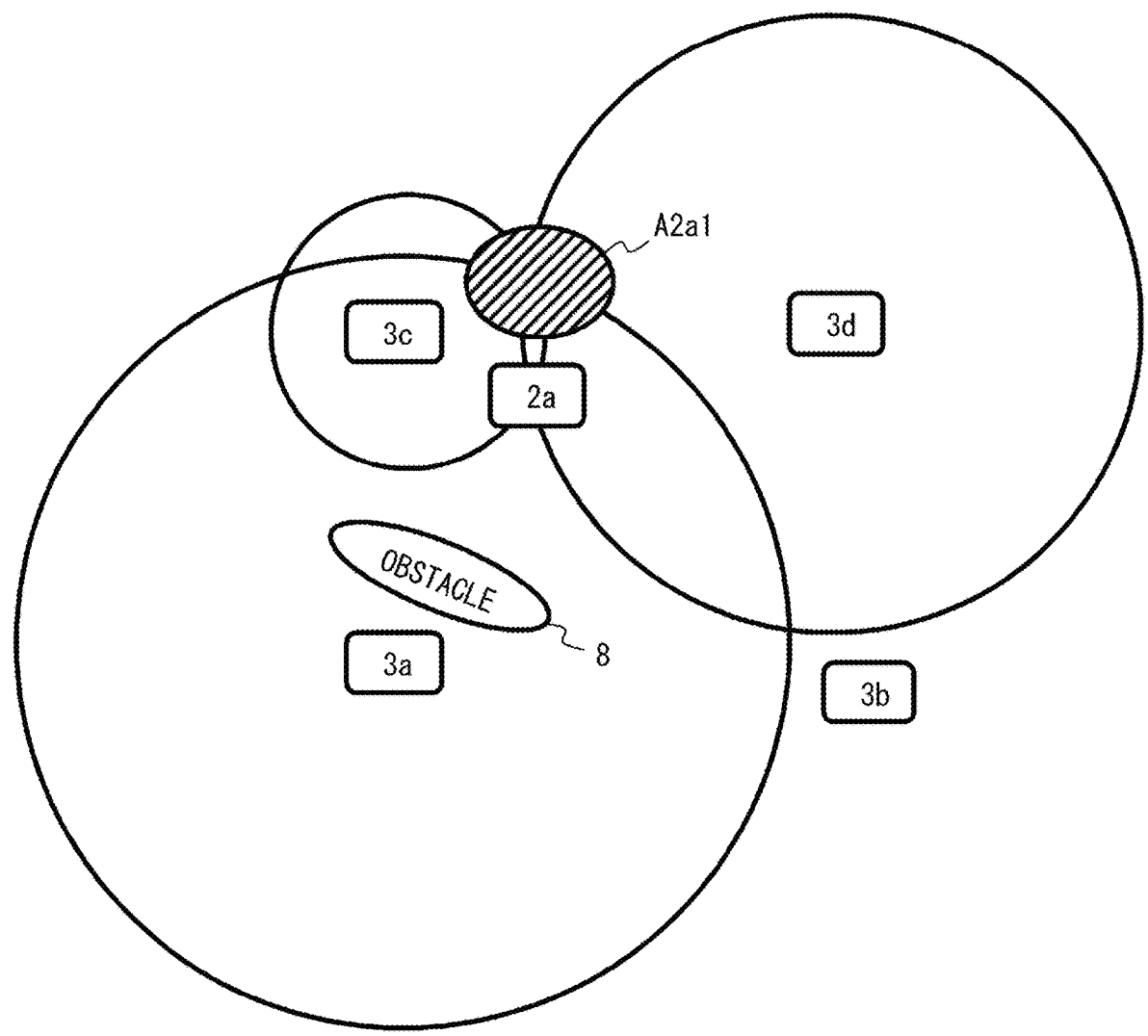
FIG. 5 is a diagram for explaining a location correction method according to Embodiment 1.

FIG. 5 is a diagram for explaining how to estimate the location of the radio 2a, using the highest three received signal strengths among the received signal strengths of the beacon signals that the radio 2a to be a subject of location estimation receives. As in FIGS. 2 and 3, the transmitters 3a to 3d are installed, and the radio 2a receives beacon signals from the transmitters 3a to 3d. Suppose that there is an obstacle 8 that attenuates radio waves between the transmitter 3a and the radio 2a. The circles centered on the transmitters 3 shown in FIG. 5 represent the results of estimation of the distances from the transmitters 3 to the radio 2a based on the received signal strengths of the beacon signals that the radio 2a receives. The estimation unit 102 of the location information computation unit 100 estimates that the radio 2a exists in the region A2a1 which is close to the peripheries of all the three circles of the transmitters 3a, 3c, and 3*d*. Since the radio wave intensity of the beacon signal received from the transmitter 3*a* is attenuated by the obstacle 8, the estimated location of the radio 2*a* is located in the region A2*a*1 which is deviated from its actual location in a direction away from the transmitter 3*a*. Table 1 shows examples of received signal strengths of beacon signals from the transmitters 3 at this time. The reliability calculation unit 103 uses the third highest received signal strength that has been used in the location estimation, as the reliability. Table 1 shows that, since the third highest received signal strength is the received signal strength of the beacon signal received from transmitter 3*a*, the reliability of the location estimation at this time is 30.

TABLE 1

| Transmitter ID | 3a | 3b | 3c | 3d |
|---|---|---|---|---|
| Received signal strength | 30 | 20 | 100 | 70 |

Figure 6:
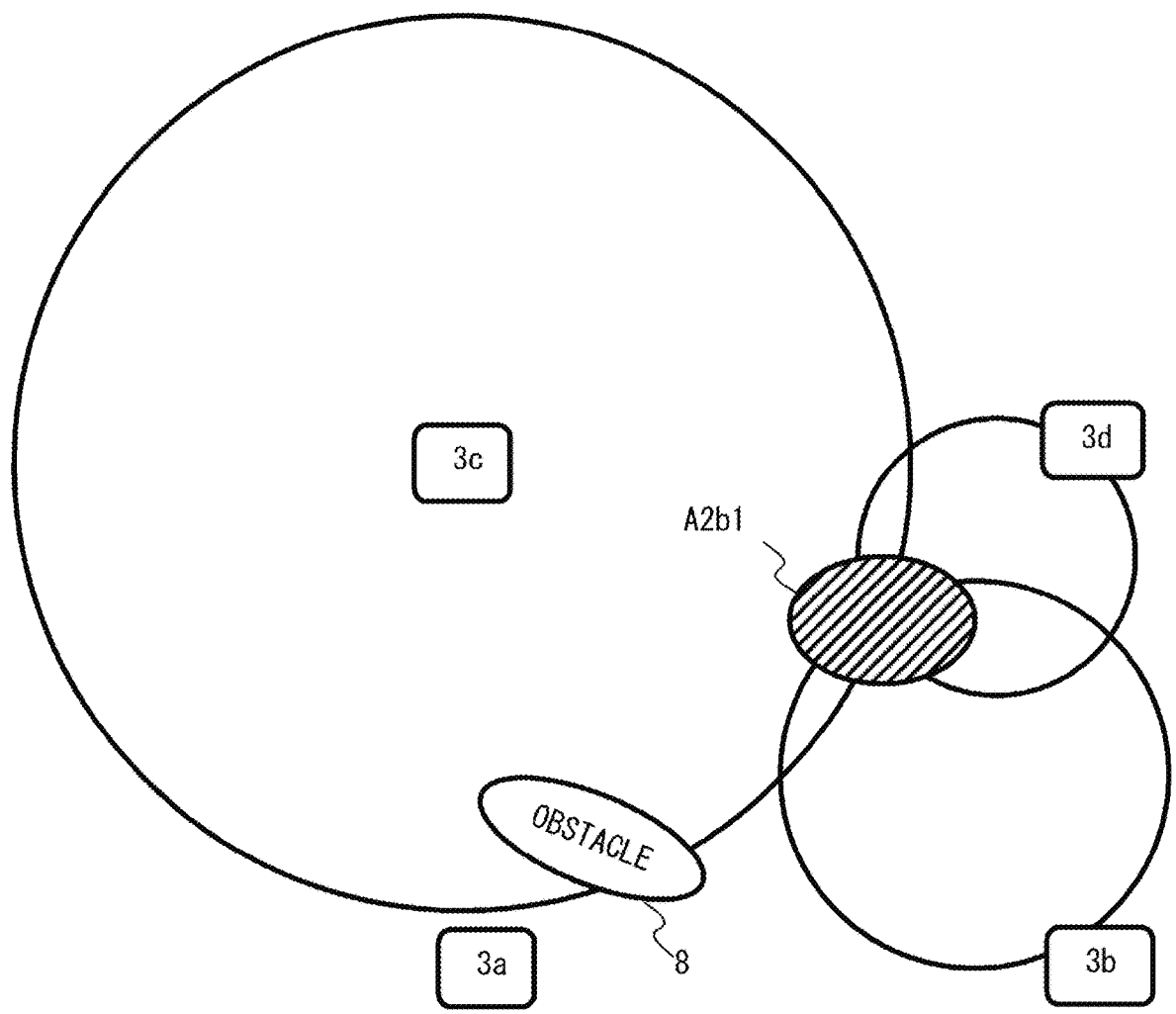
FIG. 6 is a diagram for explaining the location correction method according to Embodiment 1.
Figure 7:
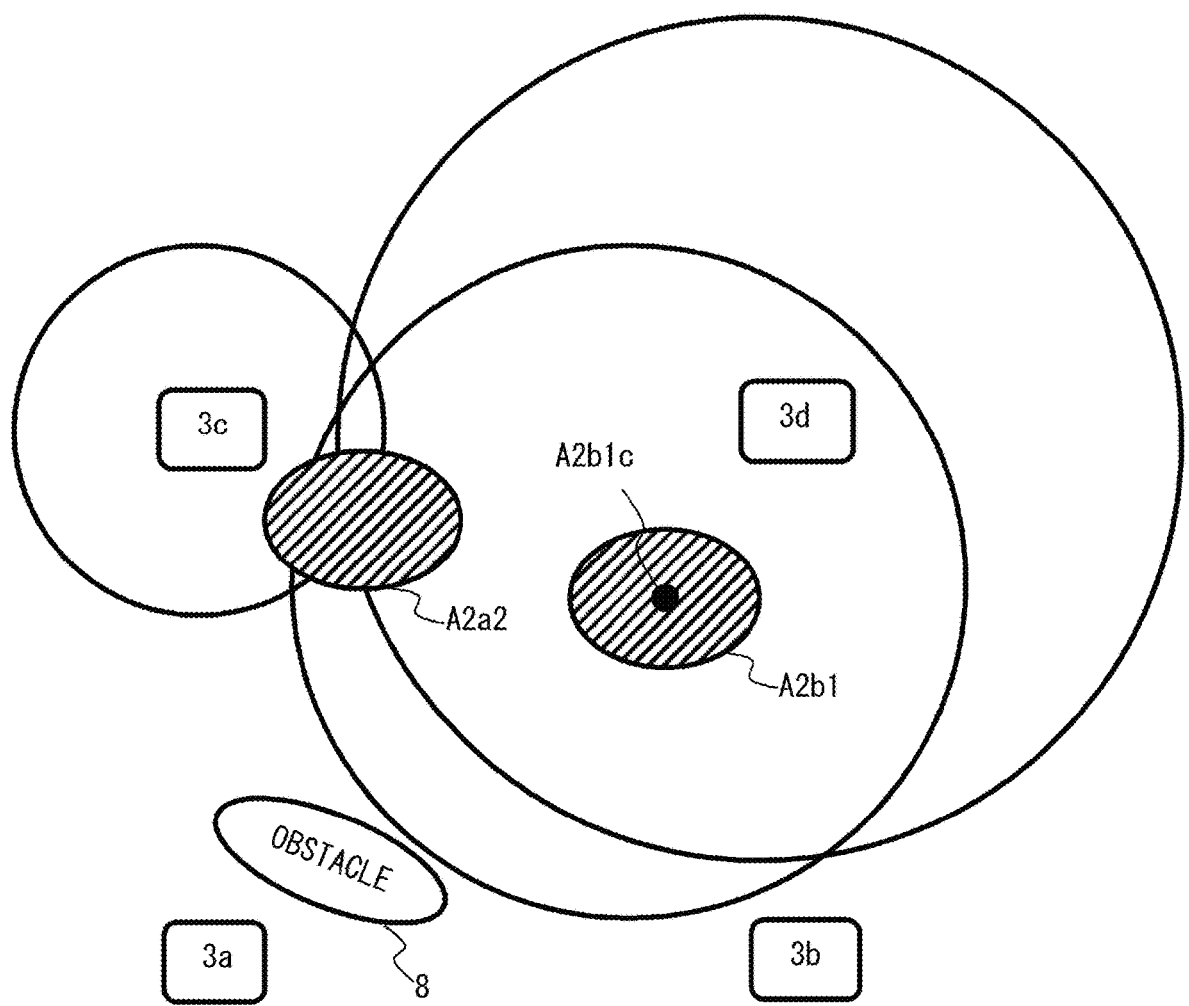
FIG. 7 is a diagram for explaining the location correction method according to Embodiment 1.

FIG. 6 shows an example case where the other radio 2*b* exists in the same location measurement region. At this time, Table 2 shows examples of received signal strengths of the beacon signals that the radio 2*b* receives from each transmitter 3. As a result of estimation of the location of the radio 2*b* using the received signal strengths related to the transmitters 3*d*, 3*b*, and 3*c*, which are the top three received signal strengths, via Table 2, the radio 2*b* is estimated to exist in the region A2*b*1 shown in FIG. 6. In this example, the third highest received signal strength is the received signal strength of the beacon signal received from the transmitter 3*c*, so that the reliability at this time is 60.

TABLE 2

| Transmitter ID | 3a | 3b | 3c | 3d |
|---|---|---|---|---|
| Received signal strength | 50 | 80 | 60 | 90 |

Once the locations of the radios 2 are estimated and the reliability of the location estimation is determined as shown in FIGS. 5 and 6, the location information computation unit 100 compares the reliability of the location estimation of each radio 2 with a predetermined threshold. The threshold of the reliability is set to 50, for example. In the example in FIG. 6, the reliability of the location estimation for the radio 2*b* is 60, which is greater than the threshold. Accordingly, the location information computation unit 100 directly employs the region A2*b*1 which is the result of estimation using the received signal strengths of the transmitters 3*d*, 3*b*, and 3*c*. In other words, the region A2*b*1 is used as the final estimated location of the radio 2*b*. On the other hand, in the example shown in FIG. 5, the reliability of the location estimation for the radio 2*a* is 30, which is below the threshold. At this time, the location information computation unit 100 checks whether there are any other radios 2 with higher reliabilities of location estimation, in the measurement region. If there is another radio 2 for which the reliability of location estimation is higher than the threshold, the location information computation unit 100 re-estimates the location of the radio 2 for which the location estimation reliability is lower, referring to the location estimation information (estimated location) on the other radio 2 and the received signal strength of the beacon signal received from the radio 2.

To be specific, if the radio 2 for which the location estimation reliability has been lower compares the received signal strength of the beacon signal received from the other radio 2 with the third highest received signal strength among those of the beacon signals received from the transmitters 3, and the received signal strength of the beacon signal received from the other radio 2 is higher, it estimates the location from the top three received signal strengths including the received signal strength of the beacon signal received from the other radio 2.

Table 3 shows the received signal strengths of the beacon signals that the radio 2*a* in the state shown in Table 1 receives from another radio 2*b*. Table 3 shows that the received signal strength of the beacon signal received from the radio 2*b* is higher than the received signal strength of the beacon signal received from the transmitter 3*a*, which has been the third highest in location estimation. Accordingly, the location information computation unit 100 re-estimates the location of the radio 2*a*, using the received signal strengths of the beacon signals received from the transmitter 3*c*, transmitter 3*d*, and radio 2*b*, which are the top three received signal strengths among the received signal strengths including the transmitters 3 and the other radio 2. At this time, A2*b*1*c*, which is the location of the center of gravity of the location estimation region A2*b*1 of the other radio 2*b*, is used as the location of the other radio 2*b* to estimate the location of the radio 2*a*. FIG. 7 shows the results of re-estimation of the location of the radio 2*a*. As shown in FIG. 7, use of the received signal strengths of the beacon signals received from the transmitter 3*c*, transmitter 3*d*, and radio 2*b* estimates the location of the radio 2*a* to be in the region A2*a*2, which is close to the actual location (the location of 2*a* shown in FIG. 5).

TABLE 3

| Transmitter ID | 3a | 3b | 3c | 3d | 2b |
|---|---|---|---|---|---|
| Received signal strength | 30 | 20 | 100 | 70 | 90 |

Figure 8:
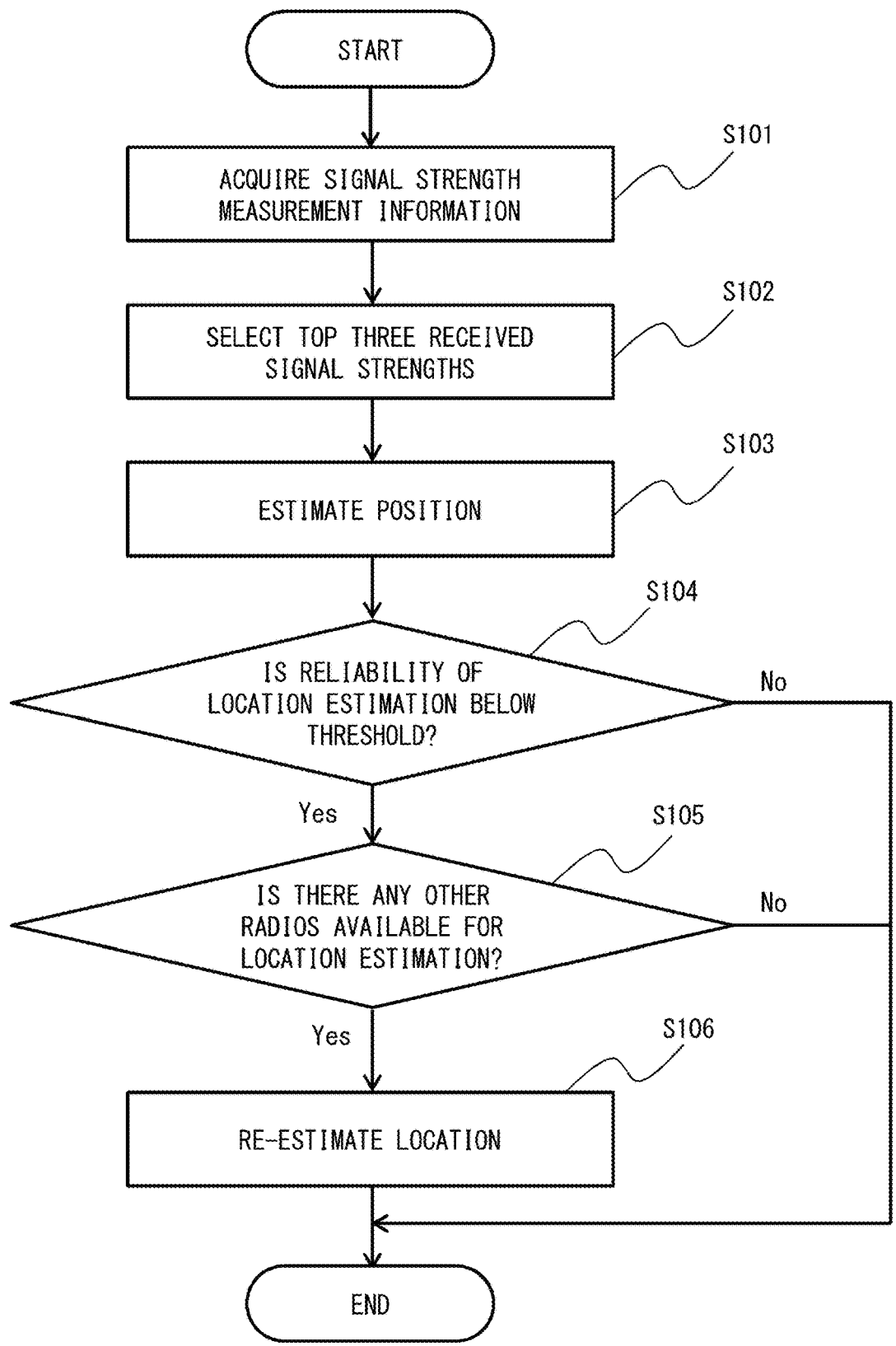
FIG. 8 is a flow chart showing an example of the location correction method according to Embodiment 1.

The location estimation method according to this embodiment will now be explained. FIG. 8 shows a flow of a location estimation method implemented in the location information server 10 according to this embodiment.

As shown in FIG. 8, first, the location information server 10 acquires signal strength measurement information from the radios 2 (S101). That is, when the plurality of transmitters 3 transmit beacon signals, the radios 2 receive beacon signals and measure the received signal strengths of the beacon signals. Further, the acquisition unit 101 of the location information computation unit 100 in the location information server 10 acquires, via the receiver 4, the signal strength measurement information containing the ID information on the beacon signals that the radios 2 receive from the plurality of transmitters 3 and the received signal strengths.

Next, the location information server 10 selects the signal strength measurement information on the top three received signal strengths (S102). The estimation unit 102 of the location information computation unit 100 compares a plurality of received signal strengths included in the acquired signal strength measurement information and selects the signal strength measurement information on the top three received signal strengths among the plurality of received signal strengths, as the received signal strength to be used for location estimation by the three-point positioning method.

Next, the location information server 10 estimates the location of the radio 2 based on the selected signal strength measurement information (S103). The estimation unit 102 of the location information computation unit 100 calculates the location of the radio 2 by the three-point positioning method using the signal strength measurement information for which the top three received signal strengths have been selected.

The three-point positioning method is a method of calculating the distance between a transmitter and a receiver (in this embodiment, a radio 2) based on the received signal strengths and estimating the location of the receiver based on the calculated distance information and the location information on the transmitter that has transmitted. In this distance calculation, since the received signal strengths attenuate in inverse proportion to the square of the distance, the received signal strength measured in a state in which the receiver and the transmitter are located with being separated by a reference distance is used as a reference value.

For instance, some information are incorporated in iBeacon signals, which are one of beacon signals, and contain parameters called Measured Power. In the case of iBeacon, the received signal strength measured while the transmitter and the receiver are separated by 1 m is defined as Measured Power, and this received signal strength serving as a reference is referred to as "RSSI@1m". Then, the distance (d) between the transmitter and the receiver can be calculated by the following expression based on the reference received signal strength and the received signal strengths (RSSI) actually measured.

$$d=10^{\{(RSSI@1m-RSSI)/(10*n)\}} \quad (1)$$

In this expression (1), n represents the propagation loss coefficient. Note that n is 2 under ideal circumstances, and varies depending on the environments where the radio waves are received.

For example, calculation of the location of each radio 2 from the signal strength measurement information on the transmitters 3a to 3c shown in FIG. 2 will be explained. In this case, the positional relationship between the transmitters 3 and the radios 2 are expressed by the three-dimensional orthogonal coordinate system (X-axis, Y-axis, and Z-axis), and the location of the transmitter 3a is represented by $(x_1, y_1, z_1)$, the location of the transmitter 3b is represented by $(x_2, y_2, z_2)$, the location of the transmitter 3c is represented by $(x_3, y_3, z_3)$, and the location of the radio 2 is represented by $(x_T, y_T, z_T)$. Further, the distance between the transmitter 3a and the radio 2 is represented by $d_1$, the distance between the transmitter 3b and the radio 2 is represented by $d_2$, and the distance between the transmitter 3c and the radio 2 is represented by $d_3$, the received signal strength observed when the radio 2 receives a signal from the transmitter 3a is represented by $RSSI_A$, and the received signal strength observed when the radio 2 receives a signal from the transmitter 3b is represented by $RSSI_B$, and the received signal strength observed when the radio 2 receives a signal from the transmitter 3c is represented by $RSSI_C$.

Then, the distances $d_1$ to $d_3$ can each be obtained from the aforementioned expression (1). Here, n=2.

$$d_1=10^{\{(RSSI@1m-RSSI_A)/(10*2)\}} \quad (2)$$

$$d_2=10^{\{(RSSI@1m-RSSI_B)/(10*2)\}} \quad (3)$$

$$d_3=10^{\{(RSSI@1m-RSSI_C)/(10*2)\}} \quad (4)$$

Further, an equation formulated using $d_1$ to $d_3$ obtained from the aforementioned expressions (2) to (4) and the distance between the transmitters 3a to 3c and the radio 2 represented by the three-dimensional coordinate system is expressed as follows:

$$\{(x_1-x_T)^2+(y_1-y_T)^2+(z_1-z_T)^2\}^{1/2}=d_1=10^{\{(RSSI@1m-RSSI_A)/(10*2)\}} \quad (5)$$

$$\{(x_2-x_T)^2+(y_2-y_T)^2+(z_2-z_T)^2\}^{1/2}=d_2=10^{\{(RSSI@1m-RSSI_B)/(10*2)\}} \quad (6)$$

$$\{(x_3-x_T)^2+(y_3-y_T)^2+(z_3-z_T)^2\}^{1/2}=d_3=10^{\{(RSSI@1m-RSSI_C)/(10*2)\}} \quad (7)$$

In Expressions (5) to (7), the parameters except $x_T$, $y_T$, and $z_T$ are known. Therefore, the estimation unit 102 calculates the three-dimensional coordinates of the radio 2 by solving the ternary quadratic equations of Expressions (5) to (7).

The location information server 10 then calculates the reliability of the location estimation made in Step 103 and determines whether the calculated reliability of the location estimation is less than a threshold (S104). When the reliability of the location estimation is less than the threshold (S104/Yes), the process proceeds to Step 105 where the location information server 10 checks whether there are any other radios 2 that can be used for location estimation (S105). Other radios 2 that can be used for location estimation shall be radios 2 that satisfy the following conditions. Here, a radio 2 whose reliability of location estimation is less than the threshold is defined as a radio 2a, and the other radio 2 is defined as a radio 2b.

Condition 1: the location estimation reliability for the radio 2b is greater than or equal to the threshold.

Condition 2: the received signal strength of the beacon signal received and transmitted between the radios 2a and 2b is higher than the third highest received signal strength of the beacon signal received by the radio 2a from the transmitter 3.

If there are any other radios 2 that satisfy the aforementioned conditions 1 and 2 (S105/Yes), the process proceeds to Step 106 where the location information server 10 re-estimates the location of the radio 2a referring to the received signal strength of the beacon signal received by the radio 2a from the radio 2b and the location estimation information on (estimated location of) the radio 2b, and employs the result of location re-estimation. For example, the location information server 10 acquires signal strength measurement information containing ID information on the beacon signals transmitted by the transmitter 3 and radio 2b and the received signal strengths from the radio 2a via the receiver 4, and determines the conditions 1 and 2 based on the received signal strengths in the acquired signal strength measurement information. The threshold for the condition 1, which is equal to the threshold employed in Step 104, for example, may be any other value. If the radio 2b satisfies the conditions 1 and 2, as in Step 102, the location information server 10 selects the top three received signal strengths from the plurality of received signal strengths including the received signal strengths of the transmitters 3 and radio 2b in the signal strength measurement information and, as in Step 103, estimates the location of the radio 2a based on the selected received signal strengths. If the condition 1 or 2 is satisfied, the location of the radio 2a may be re-estimated.

If location estimation is performed using information from the other radio 2 that does not satisfy the condition 1 or 2, the reliability of location estimation may be lower than when location estimation information from the other radio 2 is not used. For example, if the errors in the location estimation results for the other radio 2 are significant, when the location estimation results for the other radio 2 are used and thus the errors in the location estimation use the location estimation results, the location estimation reliability may be even lower. The same is true if the received signal strength in relation to the other radio 2 is low.

If the reliability of the location estimation for the radio 2a in Step 104 is greater than or equal to the threshold (S104/No) and there is no other radio 2 that can be used for location estimation in Step 105 (S105/No), the location information server 10 adopts the results of estimation made in Step 103.

As described above, in this embodiment, in the case where the location of a radio is estimated referring to the received signal strengths of the beacon signals received from the transmitters, if the reliability of the location estimation is low, the location estimation is redone using information from the other radio that satisfies predetermined conditions. This improves the reliability of location estimation and enables more accurate location estimation. In addition, clarifying the conditions for the other radio to be used for location estimation prevents the reliability of location estimation from conversely becoming low.

In the aforementioned embodiment, the top three highest received signal strengths are used for location estimation, but not necessarily top three but top four or five, that is, three or more received signal strengths may be used for location estimation.

In the aforementioned embodiment, the reliability of location estimation is evaluated referring to the third highest received signal strength, but the reliability may be evaluated in other ways. For example, it may be evaluated based on the sum or average of the top three received signal strengths to be used, or the variation of received signal strength, or even a combination thereof. For example, the reliability of evaluation based on the variation of received signal strength becomes lower as the difference of received signal strength between signals or the amount of variation between received signal strengths over time becomes greater.

Information from multiple other radios may be used for location estimation. For example, if there are three or more other radios that satisfy the conditions 1 and 2 and can be used for location estimation, the location may be estimated only using the location estimation information from those other radios and the received signal strengths in relation to other radios, without using received signal strengths from the transmitters 3.

Embodiment 2

In Embodiment 1, an example is given of a system that estimates the location of a receiver based on the received signal strengths received at the receiver in an environment where a plurality of transmitters are installed. This embodiment describes an example of application with a system that estimates the location of a transmitter based on the received signal strengths received from the transmitter in an environment where a plurality of receivers are installed.

Figure 9:
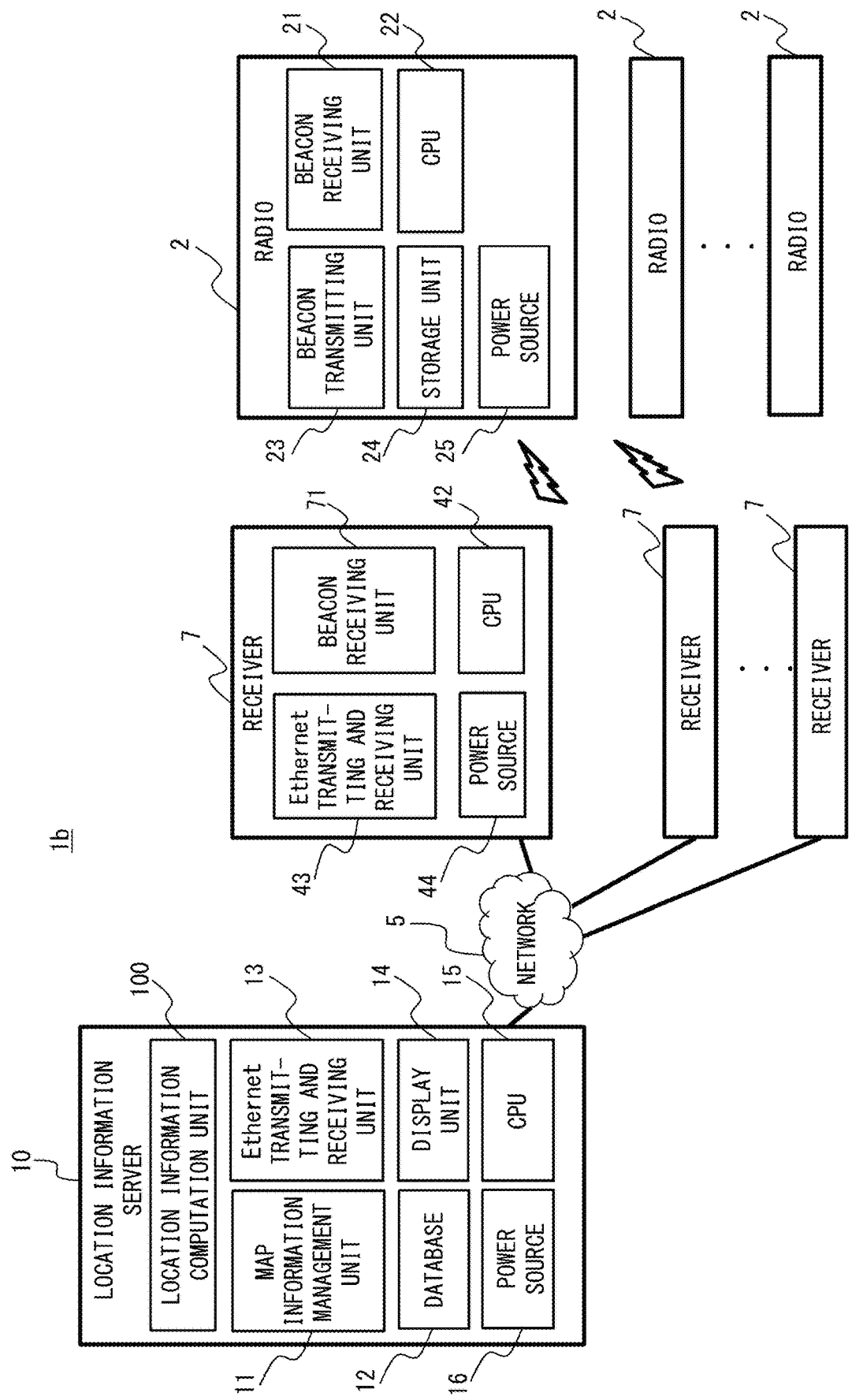
FIG. 9 is a configuration diagram showing an example of the configuration of a location estimation system according to Embodiment 2.
Figure 10:
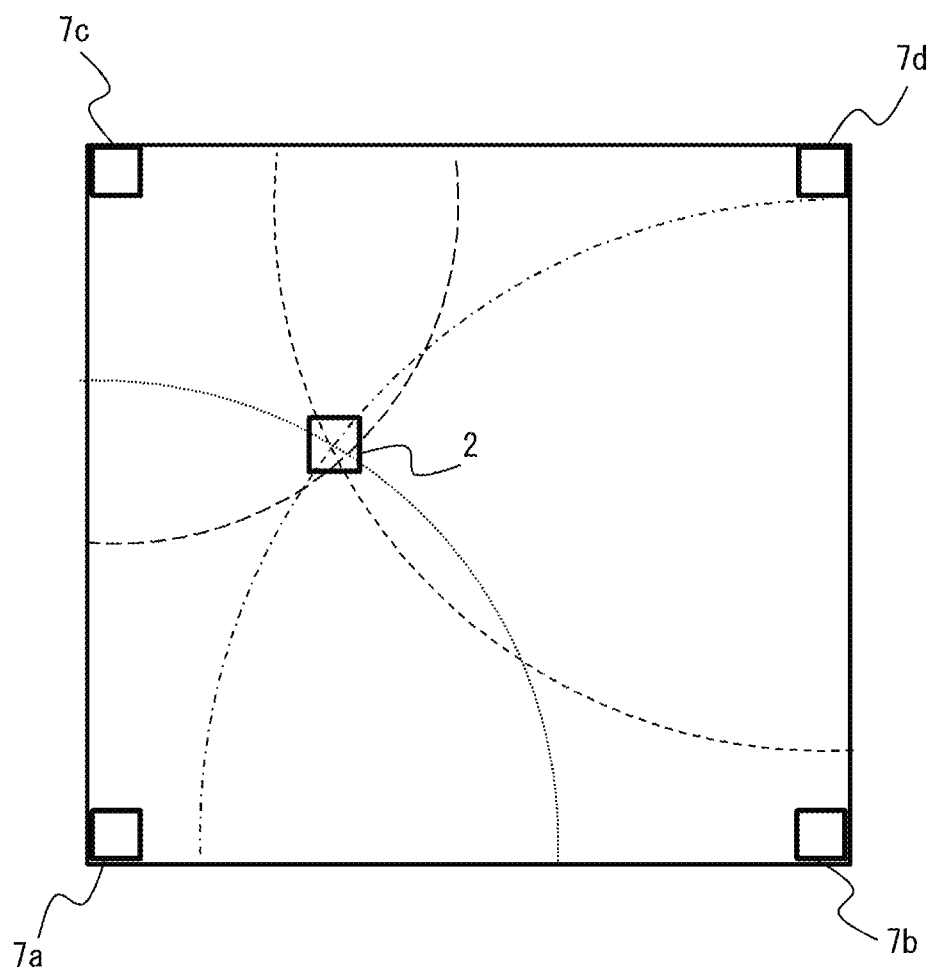
FIG. 10 is a plane view of a room illustrating an installation example of receivers according to Embodiment 2.

FIG. 9 is a configuration diagram showing an example of the configuration of a location estimation system according to this embodiment. Configurations that are common to those in FIG. 1 are denoted by the same reference numerals and may be omitted from the explanation. FIG. 10 is a plane view of a room illustrating an installation example of receivers. The perspective view of the room is the same as in FIG. 2 and is therefore omitted.

As shown in FIG. 9, the location estimation system 1b according to this embodiment, includes a plurality of radios 2, a plurality of receivers 7, and a location information server 10. The location estimation system 1b is a system that measures the locations of the radios 2 by using beacon signals transmitted by the radios 2 and received by the receivers 7.

In the example in FIG. 10, four receivers 7a to 7d are installed near the corners of the ceiling of room 6. In other words, instead of the transmitters 3a to 3d shown in FIG. 3 of Embodiment 1, the receivers 7a to 7d are installed. The installation method of receivers 7a to 7d is the same as that for the transmitters 3a to 3d in FIG. 3. In this embodiment, the three-dimensional space in the room 6 surrounded by the receivers 7a to 7d is a location measurement region. Upon reception of a beacon signal from the radio 2, the receivers 7a to 7d measure the signal strength of the received beacon signal and send the measurement results to the location information server 10 through the network 5. Based on the signal strengths received from the receivers 7a to 7d, the location information server 10 estimates the location of the radio 2 by the three-point positioning method as in Embodiment 1.

Each radio 2 is a device to be a subject of location measurement, and, as in Embodiment 1, is also a transmitter that transmits beacon signals to the receivers 7 and other radios 2 and receives beacon signals also from the other radios 2. The configuration of each radio 2 is basically the same as in Embodiment 1. The radio 2 transmits beacon signals containing ID information and signal strength measurement information on the radio 2, and the signal strength measurement information contains ID information on the beacon signals received at the radio 2 (ID information on other radios 2) and the received signal strength of the beacon signals.

The receiver 7 is a receiver that receives beacon signals and has basically the same configuration as the receivers 4 in Embodiment 1, but the beacon receiving unit 71 of each receiver 7 of this embodiment further has a function of measuring the received signal strengths of the received beacon signals. That is, similarly to the receiver 4 of Embodiment 1, each receiver 7 relays signal strength measurement information contained in beacon signals it receives to the location information server 10, measures the received signal strengths of the received beacon signals, and adds the ID information and received signal strengths of the received beacon signals to the signal strength measurement information.

As in Embodiment 1, the location information server 10 is a location estimation apparatus that estimates the locations of the radios 2 based on the received signal strengths of multiple beacon signals. The configurations of the location information server 10 and the location information computation unit 100 are basically the same as in Embodiment 1.

The location information computation unit 100 calculates the location information on a radio 2 based on the received signal strengths of the multiple beacon signals measured by the receivers 7. The location information computation unit 100 receives signal strength measurement information containing ID information on and the received signal strengths of the beacon signals each receiver 7 receives, and as shown in FIG. 10, estimates the three-dimensional location of the radio 2 identified from the ID information, using the three-dimensional positional relationship between the receivers 7 on the map and the distances to the radio 2 calculated from the received signal strengths. As in Embodiment 1, the location information computation unit 100 estimates the location of the radio 2 based on the received signal strengths from, among the plurality of receivers 7, the first to third receivers 7 that have the highest received signal strengths. In addition, the location information computation unit 100 calculates the reliability of calculation of the location information on the radio 2, and based on the calculated reliability, re-estimates the location of the radio 2, using the location estimation results for the other radios 2 and the received signal strengths of the beacon signals that the other radios 2 receive from the radio 2. The flow of location estimation is the same as in FIG. 8 of Embodiment 1.

As described above, in this embodiment, in a system in which a plurality of receivers are installed and the location of a radio is estimated based on the received signal strengths received from the radio, the location of the radio is re-estimated based on the reliability of the location estimation for the radio and other radios. In this case, as in Embodiment 1, the reliability of location estimation can be improved.

Note that the present invention is not limited to the aforementioned embodiments and can be modified as appropriated without departing from the gist of the present disclosure.

Each configuration of the aforementioned embodiments may be composed of hardware or software or a combination of both, and may be composed of one piece of hardware or software, or a plurality of pieces of hardware or software. The functions (processing) of each apparatus may be implemented by a computer with a CPU, a memory, and the like. For instance, programs for performing the location estimation method according to the embodiment is stored in a storage apparatus, and each function may be implemented by executing the programs stored in the storage apparatus through the CPU.

These programs can be stored and provided to a computer using various types of non-transitory computer-readable medium. Non-transitory computer-readable medium include various types of tangible storage medium. Examples of non-transitory computer-readable medium include magnetic storage medium (such as flexible disks, magnetic tapes, and hard disk drives), optical magnetic storage medium (e.g., magneto-optical disks), compact disc-read only memory (CD-ROM), CD-R, CD-R/W, and semiconductor memories (such as mask ROM, programmable ROM (PROM), erasable PROM (EPROM), flash ROM, and random access memory (RAM)). The program may be provided to a computer using various types of transitory computer readable medium. Examples of transitory computer readable medium include electric signals, optical signals, and electromagnetic waves. Transitory computer readable medium can provide the program to a computer via a wired channel, such as electric wires and optical fibers, or a wireless channel.

According to this embodiment, a location estimation apparatus, a location estimation method, and a program for location estimation that can improve the accuracy of location estimation can be provided.

The present invention can be suitably applied to a location estimation apparatus that estimates the locations of electronic devices and the like.

What is claimed is:

1. A location estimation apparatus comprising:
   an acquisition unit configured to acquire received signal strengths of radio signals transmitted and received between a plurality of first apparatuses at known locations and a first location estimation subject, and received signal strengths of radio signals transmitted and received between the first location estimation subject and a second location estimation subject;
   an estimation unit configured to estimate a location of the first location estimation subject, using at least top three received signal strengths among the received signal strengths of the radio signals that have been transmitted and received between the plurality of first apparatuses and the first location estimation subject, the received signal strengths having been acquired by the acquisition unit; and
   a reliability calculation unit configured to calculate a reliability of location estimation based on the received signal strengths that have been used in the location estimation in the estimation unit, wherein
   when the reliability of the location estimation calculated in the reliability calculation unit is greater than or equal to a predetermined value, the estimation unit adopts an estimation result given by the estimation unit,
   when the reliability of the location estimation calculated in the reliability calculation unit is below the predetermined value, the estimation unit determines whether the second location estimation subject satisfies a predetermined condition,
   when it is determined that the second location estimation subject does not satisfy the predetermined condition, the estimation unit adopts the estimation result given by the estimation unit, and
   when it is determined that the second location estimation subject satisfies the predetermined condition, the estimation unit re-estimates the location of the first location estimation subject, using the received signal strengths of the radio signals transmitted and received between the second location estimation subject and the first location estimation subject.

2. The location estimation apparatus according to claim 1, wherein the predetermined condition is a reliability of the second location estimation subject, and
   when the reliability of the second location estimation subject is greater than or equal to a predetermined value, the estimation unit determines that the second location estimation subject satisfies the predetermined condition.

3. The location estimation apparatus according to claim 1, wherein
   the predetermined condition is a received signal strength of radio signals transmitted and received between the first location estimation subject and the second location estimation subject, and
   when a received signal strength of a radio signal transmitted and received between the first location estimation subject and the second location estimation subject is higher than third highest received signal strength that has been used for estimating the location of the first location estimation subject, the estimation unit determines that the second location estimation subject satisfies the predetermined condition.

4. The location estimation apparatus according to claim 1, wherein the reliability is based on third highest received signal strength among the received signal strengths that has been used in the location estimation.

5. The location estimation apparatus according to claim 1, wherein the estimation unit calculates the reliability based on a total, average or variation value of the received signal strengths that has been used in the location estimation.

6. A location estimation method comprising:
   acquiring received signal strengths of radio signals transmitted and received between a plurality of first apparatuses at known locations and a first location estimation subject, and received signal strengths of radio signals transmitted and received between the first location estimation subject and a second location estimation subject;

estimating a location of the first location estimation subject, using at least top three received signal strengths among the received signal strengths of the radio signals that have been transmitted and received between the plurality of first apparatuses and the first location estimation subject, the received signal strengths having been acquired;

calculating a reliability of the location estimation based on the received signal strengths that have been used in the location estimation;

when the calculated reliability of the location estimation is greater than or equal to a predetermined value, adopting an estimation result for the location estimation;

when the calculated reliability of the location estimation is below the predetermined value, determining whether the second location estimation subject satisfies a predetermined condition;

when it is determined that the second location estimation subject does not satisfy the predetermined condition, adopting the estimation result for the location estimation; and when it is determined that the second location estimation subject satisfies the predetermined condition, re-estimating the location of the first location estimation subject, using the received signal strengths of the radio signals transmitted and received between the second location estimation subject and the first location estimation subject.

7. A non-transitory computer-readable medium storing a program for location estimation for causing a computer to perform processing comprising:

acquiring received signal strengths of radio signals transmitted and received between a plurality of first apparatuses at known locations and a first location estimation subject, and received signal strengths of radio signals transmitted and received between the first location estimation subject and a second location estimation subject;

estimating a location of the first location estimation subject, using at least top three received signal strengths among the received signal strengths of the radio signals that have been transmitted and received between the plurality of first apparatuses and the first location estimation subject, the received signal strengths having been acquired;

calculating a reliability of the location estimation based on the received signal strengths that have been used in the location estimation;

when the calculated reliability of the location estimation is greater than or equal to a predetermined value, adopting an estimation result for the location estimation;

when the calculated reliability of the location estimation is below the predetermined value, determining whether the second location estimation subject satisfies a predetermined condition;

when it is determined that the second location estimation subject does not satisfy the predetermined condition, adopting the estimation result for the location estimation; and when it is determined that the second location estimation subject satisfies the predetermined condition, re-estimating the location of the first location estimation subject, using the received signal strengths of the radio signals transmitted and received between the second location estimation subject and the first location estimation subject.

* * * * *